United States Patent [19]

Di Vincenti

[11] 3,759,272

[45] Sept. 18, 1973

[54] DENTAL FLOSS HOLDER AND DISPENSER

[76] Inventor: Angelo D. Di Vincenti, 1921 Ormandy Dr., Baton Rouge, La. 70808

[22] Filed: Sept. 7, 1971

[21] Appl. No.: 178,053

[52] U.S. Cl. ............................................... 132/92 R
[51] Int. Cl. ............................................... A61c 15/00
[58] Field of Search ........................ 32/40; 132/92 R

[56] References Cited
UNITED STATES PATENTS

| | | | |
|---|---|---|---|
| 1,990,404 | 2/1935 | Doner | 132/92 R |
| 1,618,351 | 2/1927 | Raycraft | 132/92 R |
| 1,274,423 | 8/1918 | Kristmann | 132/92 R |
| 1,468,942 | 9/1923 | Gamble | 132/92 R |

Primary Examiner—Robert Peshock
Attorney—David L. Ray

[57] ABSTRACT

A dispenser and holder for dental floss and other teeth cleaning materials which includes two prongs over which the dental floss is strung, the prongs being attached to a case containing a roll of dental floss, and means for holding the dental floss tightly over the prongs.

9 Claims, 6 Drawing Figures

PATENTED SEP 18 1973

3,759,272

INVENTOR.
Angelo D. DiVincenti

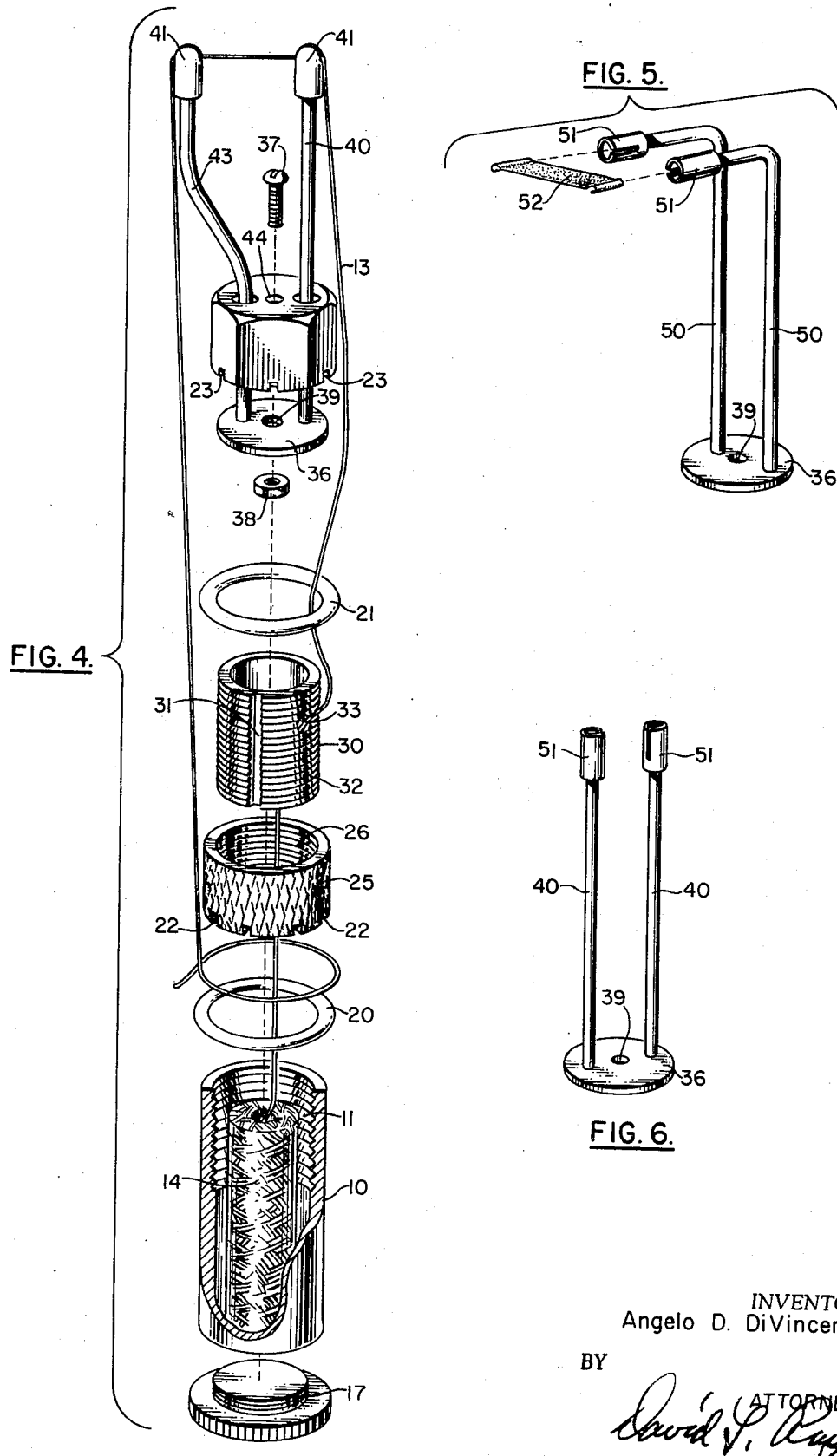

DENTAL FLOSS HOLDER AND DISPENSER

BACKGROUND OF THE INVENTION

As is well known, cleaning the teeth with dental floss is widely recommended by authorities on dental hygiene. However, many people find it very difficult to clean between all of the teeth with dental floss, especially the teeth in the rear portion of the mouth. It is difficult to insert two fingers of each hand deep into the mouth to clean the rear teeth.

It would therefore be quite helpful to have a dental floss holder which would not require the insertion of the fingers into the mouth, and would easily clean the teeth in the rear portion of the mouth. Accordingly, it is an object of the present invention to provide a dental floss holder and dispenser which may be held in one hand.

It is another object of the present invention to provide a dental floss dispenser and applicator which will clean all the teeth in the mouth without requiring insertion of the fingers of the user's hand into the mouth.

It is another object of the present invention to provide a dental floss dispenser which contains a dental floss therein which may be advanced as needed.

THE INVENTION

In accordance with the present invention, there is provided a novel dental floss holder and dispenser which includes at least two prongs connected to a case, the prongs having a piece of dental floss strung therebetween. The invention will be more fully understood by reference to the drawings in which:

FIG. 4 is an exploded, partly sectional elevational view of a dental floss dispenser;

FIG. 5 is a perspective view of another embodiment of the present invention; and FIG. 6 is a perspective view of a still further embodiment of the prongs of the present invention.

Figure 1:
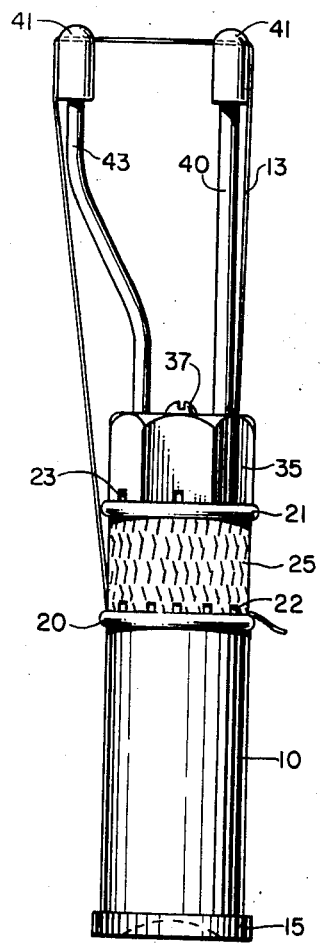
FIG. 1 is an elevational view of an assembled dental floss dispenser.
Figure 3:
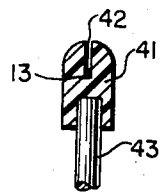
FIG. 3 is a partly sectional view taken along lines 3—3 of FIG. 2.

Referring now to the drawings and in particular Drawings 1-4, the fully assembled dental floss dispenser and holder of the present invention can be seen in FIG. 1. The dental floss dispenser includes a case 10 having upper internal threads 11 and lower internal threads 12. The lower case threads 12 engage threads 17 on cap 15 thereby closing the lower end of case 10. Cap 15 contains a slot 16 therein for insertion of a penny or screwdriver, or other means, to unscrew cap 15 from the bottom of case 10.

Figure 2:
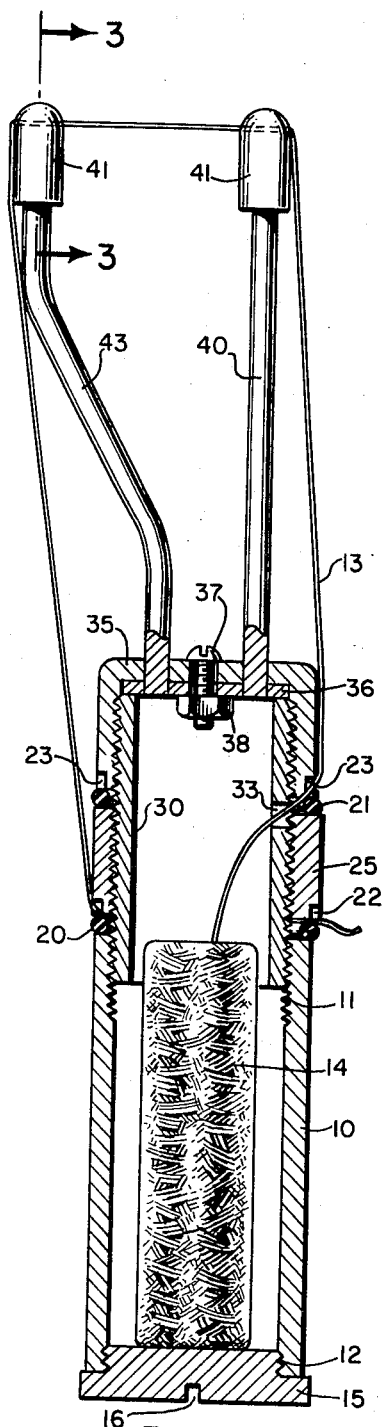
FIG. 2 is a partly sectional elevational view of a dental floss dispenser.

The upper case threads 11 engage threaded connector 30 which has threads 32 thereon. Connector 30 is generally cylindrical in shape, as can be seen from the drawings, and has a hole 33 in the side thereof through which dental floss 13 is inserted. Connector 30 screws into the upper end of case 10, as indicated in FIG. 2.

Immediately above case 10 and around connector 30 is lower ring 20, which is preferably a torus composed of a suitable material such as metal, or preferably plastic. The purpose of lower ring 20 is to contact dental floss 13 and keep it from slipping when the dispenser is fastened together tightly.

Above ring 20 is locking sleeve 25. Locking sleeve 25 is generally cylindrical in shape and has internal threads 26 for threadably engaging connector 30. Along the lower edge of locking sleeve 25 are slots 22 through which dental floss 13 is fitted. The slots are only partially indented into the edge of locking sleeve 25 so that ring 20 can still contact and press against dental floss 13 when the dispenser is fastened together tightly. The grooves or slots 22 in locking sleeve 25 merely keep the dental floss 13 from sliding around the circumference of locking sleeve 25.

A second ring 21 identical to ring 20 is located above locking sleeve 25. The purpose of ring 21 is the same as that of ring 22, i.e., to press against dental floss 13 so that the dental floss may be strung tightly about the dispenser prongs 40 and 43. Ring 21 is located below top nut 35.

Top nut 35 is any conventional nut, preferably a hexagonal-shape nut having internal threads for threadably engaging connector 30. Nut 35 has two holes in the top thereof for receipt of prongs 43 and 40, as shown in FIGS. 2 and 4. Nut 35 also has a third hole 44 therein for receipt of screw 37.

Plate 36 is connected to nut 35 by screw 37 and nut 38. Plate 36 is merely a flat, round plate washer having a hole 39 therein and having prongs 40 and 43 fastened thereto by any conventional means, such as screwing bolting, welding, gluing, etc. The prongs 40 and 43 attached to plate 36 have tips 41 connected thereto.

Prong 43 is curved outward from vertical straight prong 40 to facilitate entry of the prongs into the mouth. Tip 41 may be attached to the end of prong 43 or prong 40 by any suitable means such as gluing, or the like. Tip 41 is preferably made of some soft, flexible material which will not injure the gums when contacting the inside of the mouth or the gums. Tip 41 has a groove 42 therein for holding dental floss 13.

Dental floss 13 is held on roll 14, as can be seen in FIGS. 2 and 4. The dental floss 13 extends upwardly through the center of ring 20 and the center of locking sleeve 25, upwards through the center of connector 30 and out through hole 33 in the side of connector 30. The dental floss 13 continues upwardly through the inside of ring 21 and over the outside of nut 35. The floss then extends over the top of prong 40 through tip 41 onward to prong 43 through groove 42 in tip 41 and downwardly. The dental floss is wrapped around connector 30 after the dispenser is assembled, as shown in FIG. 2, between locking sleeve 25 and lower ring 20. The string fits into a groove 22 and locking sleeve 25.

After a portion of dental floss between tips 41 has been used, a new portion of dental floss may be advanced off of spool 14 to replace the used portion with an unused portion. To replace the used portion, the case 10 is merely screwed downward on connector 30 to loosen lower ring 20. Locking sleeve 25 is then screwed downward from ring 21 thereby loosening the string extending inside ring 21. The dental floss 13 is unwrapped at the lower loose end from connector 30 and pulled downward to advance the string from spool 14. When the desired amount of string is advanced, the dental floss is wrapped around connector 30 and locking sleeve 25 is tightened against ring 21. When locking sleeve 25 is tight, case 10 is screwed upward on connector 30 to force lower ring 20 against locking sleeve 25. To replace dental floss spool 14, plug 15 is unscrewed from the bottom of case 10, and a new spool is inserted.

All of the various components of the present invention may be made from plastic, although it is preferred that the prongs 40 and 43 be made of a metal covered with a plastic coating for a maximum strength. Ring 20 and 21 could be eliminated from the present invention since case 10 contacting locking sleeve 25 and nut 35 contacting locking sleeve 25 would hold the dental floss therebetween. However, when top nut 35 or case 10 is made of metal it is preferred that rings 20 and 21 be included to keep from cutting the dental floss 13. It is also possible to delete ring 20, locking sleeve 25 and top ring 21. In such an embodiment case 10 would contact nut 35 to pinch dental floss 13 therebetween. However, this embodiment is not preferred because the dental floss is more easily tightened when it is possible to lock the dental floss extending out of hole 33 with ring 21 and locking sleeve 25 prior to wrapping the loose end of dental floss 13 around connector 30 and tightening the ring 20 and case 10.

In the preferred embodiment as shown in the drawings, the dental floss is locked with locking sleeve 25 and top ring 21 and then is stretched tightly over tips 41 and wrapped around connector 33, thereby assuring a tight, taut dental floss string. The dental floss 13 is then locked in position by tightening the bottom of case 10 against ring 20.

Another embodiment of the present invention is shown in FIG. 5. In FIG. 5, prongs 40 and 43 have been replaced by prongs 50 which have a right angle bend near the top thereof and are otherwise straight. Tips 51 have slots as indicated therein for receipt of sandpaper 52. Sandpaper 52 is rolled slightly at each end to fit within tip 51 without sliding. Such sandpaper strips are frequently used by dentists to sand small deposits from in between the teeth.

A still further embodiment of the present invention is shown in FIG. 6 in which prongs 40 are straight. The tips 51 are the same as those in FIG. 5, and a piece of sandpaper may be inserted therein as indicated in FIG. 5.

In another embodiment, slot 31 shown in FIG. 4 may be provided in connector 30 for receipt of dental floss 13. Slot 31 performs the same function as hole 33, i.e., dental floss 13 can be fed upward from roll 14 through slot 31 and on upward through ring 21.

The foregoing is considered as illustrative only of the principles of the invention. Further, since numerous modifications or changes will readily occur to those skilled in the art, it is not desired to limit the invention to the exact construction and operation shown and described, and accordingly, all suitable modifications and equivalents may be resorted to falling within the scope of the invention as claimed.

What is claimed is:
1. A dental floss holder and dispenser comprising
   a. first means for holding a roll of dental floss, said first means comprising tube means, said tube means comprising a hollow cylinder having threads on the inside of one end of said cylinder, the end of said cylinder opposite said one end of said cylinder containing means for closing said cylinder,
   b. second means for holding a length of said dental floss, said second means comprising two prong means, each of said prong means connected at one end to third means, said prong means comprising two prongs connected at one end to base means, said prongs having tip means thereon, and
   c. third means connecting said first means to said second means, said third means comprising:
      i. cylindrical connector means connected to said first means, sayd cylindrical connector means comprising a hollow cylinder thread on the outside, said hollow cylinder contains hole means therein for receiving said dental floss,
      ii. locking sleeve means connected to said cylindrical connector means, said locking sleeve means having ring means located above and below said locking sleeve means, said locking sleeve means comprising a hollow cylinder threaded on the inside, said hollow cylinder containing groove means for receipt of said dental floss, and
      iii. nut means connecting said cylindrical connector means to said second means, said nut means comprising an internally threaded nut containing groove means for the receipt of said dental floss.

2. The holder and dispenser of Claim 1 wherein said means for closing said cylinder comprises a threaded plug.

3. The holder and dispenser of claim 1 wherein said prong means have tip means thereon for holding sandpaper.

4. The holder and dispenser of claim 1 wherein one of said prong means is straight and the other prong means is curved.

5. The holder and dispenser of claim 1 wherein both of said prong means are straight.

6. The holder and dispenser of claim 1 wherein both of said prong means are bent to form an approximate right angle.

7. The holder and dispenser of claim 1 wherein said ring means comprises a torus.

8. The holder and dispenser of claim 1 wherein said hollow cylinder contains a slot therein for receiving said dental floss.

9. The holder and dispenser of claim 1 wherein said nut contains two holes in one end for receipt of said prongs.

* * * * *